United States Patent

[11] 3,603,538

[72] Inventor John K. Vitas
765 S.E. Ridgeview Terrace, Beaverton, Oreg. 97005
[21] Appl. No. 869,819
[22] Filed Oct. 27, 1969
[45] Patented Sept. 7, 1971

[54] ADJUSTABLE CORROSION RESISTANT PIPE HANGER
1 Claim, 4 Drawing Figs.

[52] U.S. Cl. .................................................. 248/59, 248/327
[51] Int. Cl. ........................................................ F16l 3/14
[50] Field of Search ........................................... 248/59, 60, 61, 62, 63, 68, 317, 328, 341, 342

[56] References Cited
UNITED STATES PATENTS

| 840,337 | 1/1907 | Johnson | 248/60 |
| 971,077 | 9/1910 | Roberts | 248/59 |
| 1,450,640 | 4/1923 | Norman | 248/62 X |
| 2,744,706 | 5/1956 | Gerdy | 248/60 |
| 2,835,464 | 5/1958 | Kolodin | 248/62 |

Primary Examiner—Chancellor E. Harris
Attorney—Buckhorn, Blore, Klarquist and Sparkman ABSTRACT: A pipe hanger having a corrosion resistant strap hung by two eye portions on the arms of a support member, and retained in place by a safety bar. The support member and safety bar are adjustable along a hanger rod to properly locate the strap and the pipe it supports.

PATENTED SEP 7 1971 3,603,538
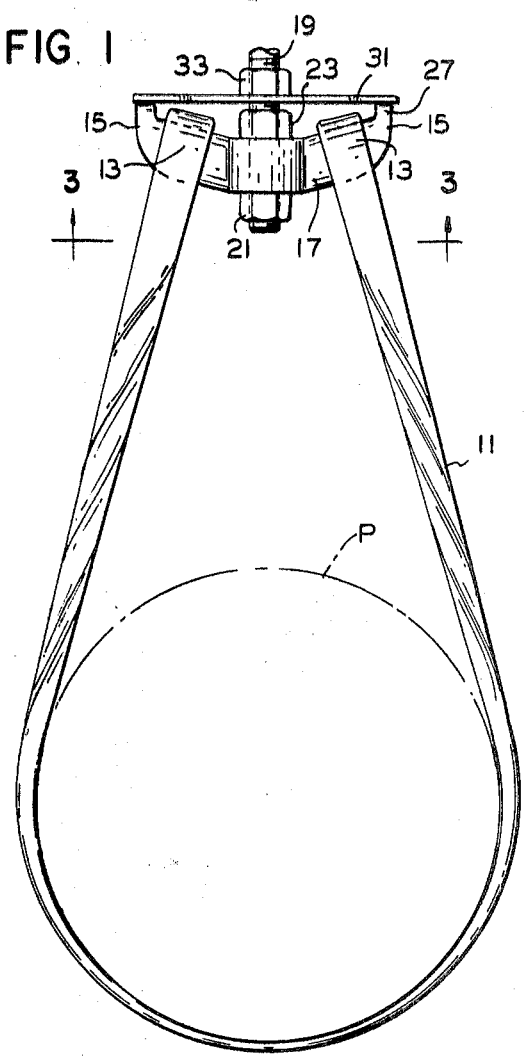
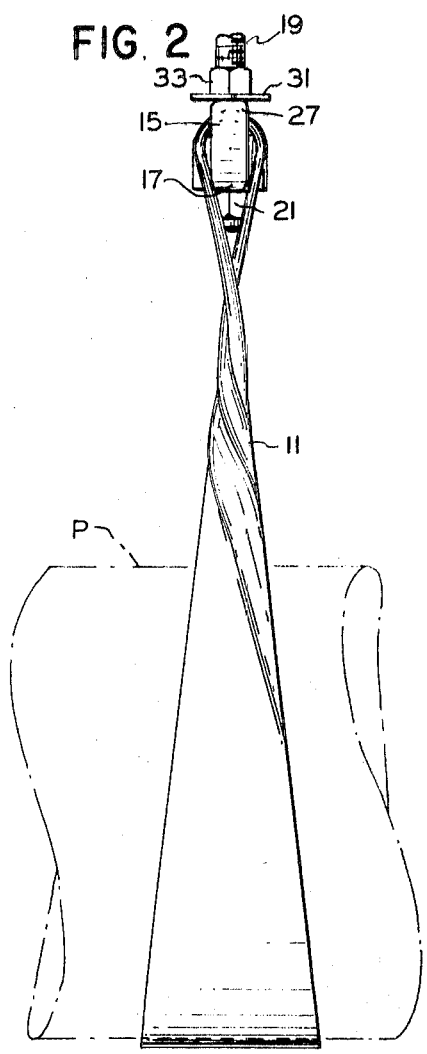
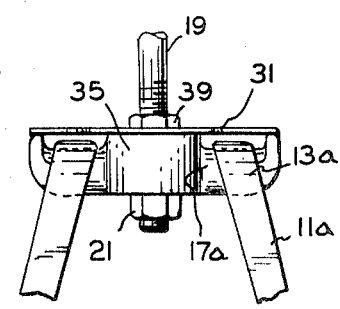
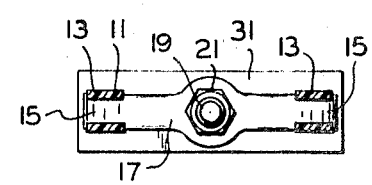
JOHN K. VITAS
*INVENTOR*
BY
BUCKHORN, BLORE, KLARQUIST & SPARKMAN
*ATTORNEYS*

ADJUSTABLE CORROSION RESISTANT PIPE HANGER

BODY OF THE APPLICATION

The present invention relates to a corrosion-resistant hanger for pipes, and particularly for iron or steel pipes although it also will have substantial use for supporting plastic or corrosion resistant pipes. As is known, metal-to-metal contact must be avoided in many environments, particularly ones that are wet or corrosive. Otherwise galvanic and/or electrolytic action will occur to damage the hanger and pipes. In corrosive atmospheres it is also desirable to avoid the use of metal hangers because they will be attacked by the atmosphere.

My hanger meets the above requirements and also provides for vertical adjustment of the strap to facilitate proper support of the pipe relative to the ceiling or other overhead structure. My hanger also has means for retaining the strap in place at any position of vertical adjustment thereof.

Two embodiments of my invention are described in the accompanying drawings, wherein:

FIG. 1 is a front elevation view of one form of my hanger shown supporting a metal pipe;

FIG. 2 is a side elevational view of the hanger and pipe;

FIG. 3 is a horizontal sectional view taken along line 3—3 of FIG. 1;

FIG. 4 is a fragmentary side elevational view of a modified form of my invention.

My hanger comprises a corrosion-resistant strap 11 having a pair of eyes 13 which fit on the arms 15 of a lateral support member or hanger bar 17. Thus, the arms 15 provide laterally extending eye support portions for the eyes 13. The member 17 is formed with a hole to fit on a threaded support rod 19 which is secured at its upper end (not shown) by any conventional means to the ceiling or other overhead structure from which the pipe P is to be hung.

A pair of nuts 21 and 23 located the support member 17 on the rod 19 and facilitate vertical adjustment of the support member along the rod 19. This enables the strap to be located at the desired position to properly support the pipe P.

Each arm 15 terminates in an upwardly projecting spacer lug 27 to provide clearance for the eyes 13. A safety bar or strip 31 has a hole to fit loosely on the rod 19 with the ends of the bar resting on the lugs 27. The bar is held in such position by a nut 33. In fact, I may dimension the parts such that the bar 31 rests on the nut 33 (or can be deflected to do so) whereby the nut 33 acts as an additional jamnut.

The bar 31 retains the ears on the support member 17, even though the pipe P and strap 11 bounce quite violently, under the influence of water hammer in the pipe, or other causes. It is pointed out that the spacer lugs have a height so as to dispose the bar in spaced relation above the eyes 13, so that while the eyes are positively precluded by the safety bar from dislodgement from the hanger bar, the eyes freely hang on the hanger bar and thus may adjust their positions demanded by movements of the pipe. This lessens the stresses on the parts that might otherwise be created.

The bar, however, by virtue of its loose fit on the rod 19 is carried by the support member 17 when the latter is vertically adjusted.

I find that I can provide a suitable corrosion-resistant strap 11 by providing fiberglass strands, impregnating them with a suitable liquid plastic, winding the strands directly on a mandrel or mold, and then curing the impregnated strands.

FIG. 4 shows a modified form of hanger in which the strap 11a is presumed to have eyes 13d of thin cross section. In such instance, I provide a support member 17a having a central boss 35 upon which the safety bar 31 can rest. I can use only one upper nut 39 instead of two, as in FIG. 1, nut 39 clamping the bar 31 against the support 17a, and the support member against the nut 21.

I claim:

1. A corrosion-resistant hanger comprising:
    a corrosion-resistant strap having an intermediate saddle portion in which a pipe may rest,
    said strap having upwardly extending end portions each terminating in an eye,
    a transversely extending hanger bar having a central bore to slidably pass a threaded support rod,
    a nut to thread on said support rod beneath said hanger bar for supporting the hanger bar on the rod in a desired position,
    said hanger bar having laterally extending eye support portions,
    said eyes being loosely received on said support portion of said hanger bar, one on either side of said bore,
    a safety bar having a central opening to slidably pass said support rod and be disposed in a position above said hanger bar,
    said hanger bar having at each end an upwardly projecting spacer lug,
    said safety bar spanning the distance between the central portion of said hanger bar and said lugs and engaging the upper surfaces of said lugs,
    a nut for holding said spacer bar in firm engagement with said lugs,
    the height of said lugs being such as to dispose said safety bar in spaced relation above said eyes so that while said eyes are positively precluded from inadvertent dislodgement from said hanger bar, they freely hang thereon and thus may adjust their positions as demanded by the movement of the pipe they support.